United States Patent [19]

Debenham

[11] 4,102,304
[45] Jul. 25, 1978

[54] APPARATUS FOR APPLICATION OF SEALANT

[75] Inventor: Michael Debenham, Frankston, Australia

[73] Assignee: The Broken Hill Proprietary Company, Limited, Melbourne, Australia

[21] Appl. No.: 697,844

[22] Filed: Jun. 21, 1976

Related U.S. Application Data

[63] Continuation of Ser. No. 466,057, May 1, 1974, abandoned.

[30] Foreign Application Priority Data

May 1, 1973 [AU] Australia .................. 3155/73

[51] Int. Cl.² .................... B05C 5/00; B21D 51/46
[52] U.S. Cl. .................... 118/421; 118/410; 118/429; 113/80 B
[58] Field of Search .................... 118/421.3, 410, 408, 118/411, 401, 429, 243; 425/809; 113/80 R, 80 B; 427/230, 232, 234, 235, 238, 239, 256, 287, 288, 105, 130, 133, 430, 439, 445, 435

[56] References Cited

U.S. PATENT DOCUMENTS

| 2,046,197 | 6/1936 | Kronquest | 113/80 B |
| 2,098,857 | 11/1937 | Buckingham | 118/408 UX |
| 2,236,968 | 4/1941 | Cunnington | 118/421 X |
| 2,391,341 | 12/1945 | Pearson et al. | 113/80 B |
| 2,667,138 | 1/1954 | Maher | 118/421 |
| 2,993,272 | 7/1961 | Carlzen et al. | 118/429 UX |
| 3,004,505 | 10/1961 | Dvorak | 118/410 X |
| 3,119,363 | 1/1964 | Rieben | 118/410 UX |
| 3,224,411 | 12/1965 | Blaha et al. | 118/408 |
| 3,618,565 | 11/1971 | Taylor et al. | 118/421 |
| 3,710,759 | 1/1973 | Tardoskegyi et al. | 118/410 X |

FOREIGN PATENT DOCUMENTS 8,534  2/1908  France .................. 113/80 R

Primary Examiner—James Kee Chi
Attorney, Agent, or Firm—Murray & Whisenhunt

[57] ABSTRACT

This specification disclosed a method of and apparatus for the application of sealant gasketing or protective material to a can end or to other container members in which a transfer head having a transfer face in the shape of the container member area to be covered by the sealant is covered with sealant and the container member brought into contact with at least the sealant on the transfer face to achieve transfer of the sealant to the container member. In one form the transfer head has a passage opening to the transfer face through which sealant is pumped to cover the transfer face. In another form the transfer head is arranged to be immersed in a tank of sealant to cover the transfer face with sealant.

12 Claims, 3 Drawing Figures

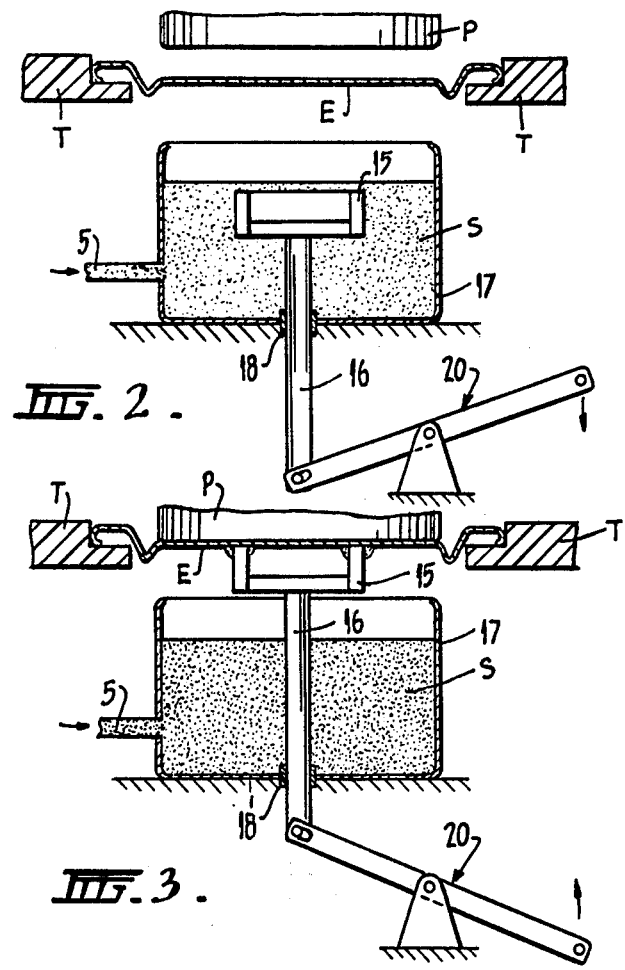

APPARATUS FOR APPLICATION OF SEALANT

This is a continuation of application Ser. No. 466,057, filed May 1, 1974 now abandoned.

This invention relates to an improved apparatus for the application of sealant, gasketing or protective material to can ends and other container members.

Several different forms of easy-opening closure wherein the closure is partially sheared from the container member are known. Where containers incorporating such closures are used for liquids or for goods for consumption, it is generally necessary to hermetically seal the closure by applying sealant to the inside face of the end surrounding the periphery of the closure. The application of sealant prevents gas leakage in the case of carbonated beverages and assists in preventing accidental opening of the closures. It also protects the raw metal edge against corrosion and for this purpose a repair lacquer may also need to be applied to the outside face of the end.

One of the problems faced by can makers is the proper application of controlled amounts of sealant to the ends at production line speeds. Most of the methods for the application of sealant so far developed suffer from disadvantage of lack of control over the amount and/or location of sealant on the end.

In one aspect, the present invention provides an apparatus for applying sealant gasketing or protective material (hereinafter called "sealant") to a container member comprising locating the container member in alignment with a transfer head having a transfer face at least in the shape of the container member area to be covered by the sealant, covering said transfer face with sealant, and bringing the container member and at least the sealant on the transfer face into contact to transfer the sealant thereon to the container member.

In another aspect the invention provides an apparatus for applying sealant gasketing or protective material (hereinafter called "sealant") to a container member, comprising a sealant transfer head having a transfer face at least in the shape of the container member area to be covered by the sealant, means for covering the sealant transfer face with sealant and means for causing a container member to contact at least the sealant on said transfer face.

Preferred forms of the invention will now be described with reference to the accompanying drawings in which:

FIG. 2 is a diagrammatic representation of an alternative form of sealant applicator embodying the invention, and FIG. 3 shows the embodiment of FIG. 2 in the sealant transfer position.

Figure 1:
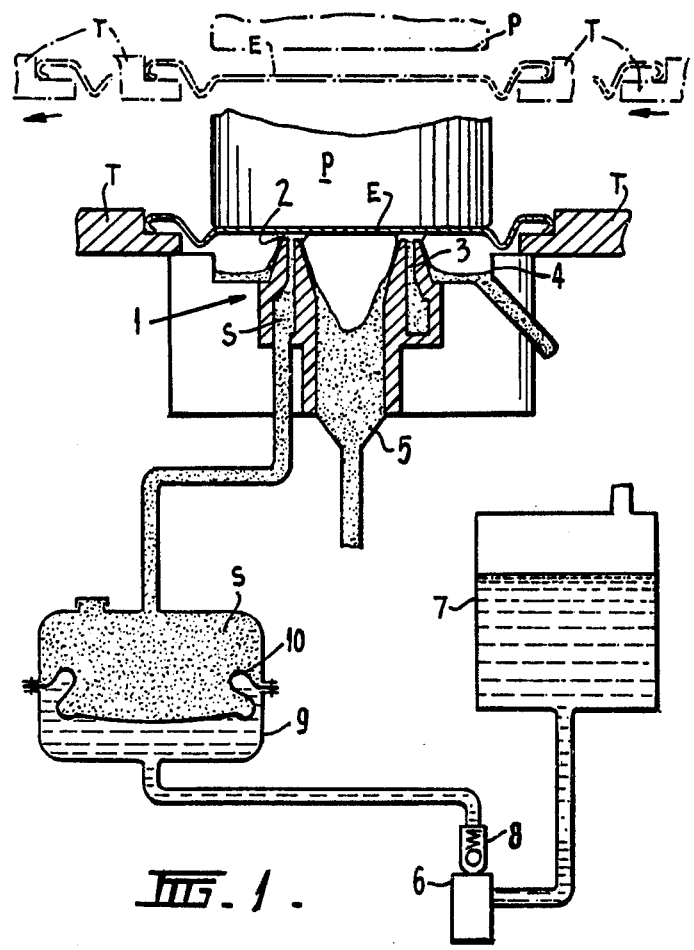
FIG. 1 is a diagrammatic representation of a sealant applicator system embodying the invention.

Both of the embodiments shown in the drawings have been designed for the application of narrow annular bands of sealant, such as a plastisol, to cover the edges of push-in easy opening closures in a can end. In each case the sealant applicator is positioned in one of the press stages of a known rotary or linear transfer press having a movable transfer means T for locating successive can ends E in each press stage. The transfer means T operates to move the ends E between stages, the transfer means being lowered, about one-fourth inch, from the transfer position to the press operation position and raised again after the press member P has been lowered at each stage to perform a die operation on the end.

In the present case, the press member P pushes the end down to achieve sealant transfer.

The sealant applicator system shown in FIG. 1 comprises a sealant transfer head 1 having an annular transfer face 2 to which sealant S is pumped through a continuous annular passage 3 opening to the face 2. The transfer head 1 has a generally tubular shape and a sealant overflow trough 4 surrounds the outer periphery of the head 1 while the overflow at the inner periphery of the head is collected by a trough 5 closing the lower end of the tubular head body. The collected sealant is led away from the head as shown for disposal or reuse.

The pumping of sealant is a problem for two reasons: very few types of pumps will operate accurately and consistently at the small flow rates required and since the sealant is abrasive and viscous, known pumps will not operate for long before requiring repair. For these reasons it was necessary to devise an alternative pumping system that would avoid these problems.

The pumping system shown is very simple but is extremely reliable and accurate at small flow rates. It comprises a small volume positive displacement pump 6 of any suitable type having its inlet connected to a tank 7 of oil or other suitable working liquid. The outlet of the pump 6 is connected via a non-return valve 8 to displacement transfer vessel 9 having two halves separated by a flexible diaphragm 10. The vessel 9 contains a closed supply of sealant S on the opposite side of diaphragm 10 to the oil and an outlet for the sealant is connected to the sealant transfer head 1 as shown.

Thus for each oil displacement performed by the pump 6 a correspoding volume of sealant is displaced from the vessel 9 to the transfer head 1 where it flows over the transfer face 2. The displacement of pump 6 is preferably controlled so that there is always an excess of sealant S at the transfer face 2 during operation of the system. However, the pump 6 may be controlled so that the replacement sealant equals the sealant transferred to the end. Because of its viscous nature, the sealant S forms a relatively large meniscus on the transfer face 2 thus presenting a suitable volume of sealant ready for transfer to a can end E.

In use, the transfer means T lowers an end E into the press stage housing the sealant applicator and the press member P pushes the end E into close proximity with the transfer head 1. It is not necessary or desirable for the end to contact the transfer face 2 since adequate sealant is transferred simply by the end contacting the meniscus of sealant S, as shown in FIG. 1. If the transfer face 2 is wiped of sealant it is found that the even build up of sealant over the whole of the face may be much slower and less certain than if a small amount of sealant is left on the face.

A prototype form of the above described system has been tested applying sealant to a paper tape. The transfer head had two spaced annular transfer faces about nine-sixteenths and five-sixteenths inch in diameter, and one-eighth inch wide suitable for applying sealant about 0.015 inch thick to an end having two push-in closures of similar diameters. A spacing of 0.010 inch between the tape and transfer face was found to satisfactorily transfer the required amounts of sealant. The positive displacement pump used was a Diesel fuel injection pump adjusted to pump oil at approximately 12 ml/min. It was found that sealant was cleanly and accurately transferred at rates of up to 350 sealant transfers/min. and it is believed that the system could achieve rates considerably higher than this without reduction in quality. In this prototype, the oil was heated and was circulated through the transfer head to make the sealant more readily flowable. In a production model it is envisaged that electric heating coils may be inserted in the head to achieve the same result.

In the alternative embodiment shown in FIG. 2, the transfer head 15 is fixed to the end of a shaft 16 which is vertically reciprocable by means of a mechanism schematically represented by 20. The shaft 16 and head 15 are adapted to be immersed in a tank 17 of sealant S at the bottom of the shaft stroke and the shaft 16 is supported by a bearing/seal 18 in the bottom of the tank 17. At the top of the shaft stroke the transfer head 15 is arranged to contact the can end E as the press member pushes down on the end E.

The mechanism 20 is controlled so that as a new end is being transferred to the die stage housing the sealant applicator, the transfer head 15 is immersed in the sealant to load its face with sealant. Since the position of the transfer head 15 at the bottom of the shaft stroke is relatively fixed, the sealant S must be maintained at a level above the head 15 in this position. Sealant pumping means (not shown), such as the pumping system of FIG. 1, are provided to replenish the sealant S in the tank 17 after each operation at a controlled rate corresponding to the rate of removal of sealant from tank 17 by the transfer head. Alternatively, the pump may maintain the sealant S at an overflow level in the tank 17.

The operation of this embodiment is basically the same as the previous embodiment only the transfer head 15 is reciprocated in timed relationship with the press member P so that the head 15 is at the top of its stroke and contacts the end E as the press member P pushes the end E down. The head 15 is lowered as the end E is lifted off the press stage. Once again clear and accurate sealant transfer is achieved. It will be appreciated that contact between the end and transfer face is not necessary and transfer will be achieved by contact between the end and the sealant on the transfer face.

The connection between the shaft 16 and the reciprocating mechanism 20 may include resilient means that is compressed to absorb the small downward movement of the shaft 16 under the face applied to the end E by the press member P. Alternatively, the press member P may be resiliently faced to achieve the same result.

The sealant supply shown may be replaced by a supply system of the type shown in FIG. 1, that is, a sealant pumping system feeding sealant to a passage in head 15 which opens to the transfer face. In such an arrangement, the transfer face may be covered by an absorbent material or by flexible lips forming the face. During the sealant transfer operation the sealant is squeezed from the absorbent material or the lips deflected to discharge the sealant onto the end or other article.

While the sealant pumping system described in relation to FIG. 1 is most preferred, it may be modified by replacing the positive displacement pump by a pressurized oil supply connected to the displacement transfer vessel 9 via a flow control valve if necessary. Similarly, the system may be replaced by a sealant pump discharging through a flow control valve to the transfer head.

While the preferred forms have been described in relation to the application of sealant, the invention is also applicable to the application of gasket liner material to the can end. At present this material is applied by a process involving spinning of the end thus requiring a separate operation after the last press stage. Using the present apparatus in any one of its forms a tubular transfer head having a transfer face of the required dimensions is used to transfer a band of gasketing material of the required thickness to the can end. Where the end has a closure, a further transfer head may be incorporated in the same press stage or in a previous or subsequent stage.

Where the system is used to apply repair lacquer to the top of a can end, the end may be inverted prior to this operation.

I claim:

1. Apparatus for applying substantially uniform amounts of sealant material to container members, said apparatus comprising a sealant transfer head and container member holding means for holding and aligning a container member over the transfer head, said transfer head including sealant transfer face means for continuously forming a meniscus of sealant during periods between sealant transfers, a part of the meniscus transferable to said container member, said face means and said meniscus having a configuration generally corresponding to the area of the container member that is to be covered by sealant, said transfer head also including sealant supply means opening to said face means for continuously supplying amounts of sealant thereto, said sealant transfer face means and said sealant supply means cooperating so that said sealant supply means provides to said sealant transfer face means sealant in an amount which in the interval between successive sealant applications to the next container member exceeds the amount of sealant required to cover a given container member area, and said sealant on said transfer face means continuously forms said meniscus of sealant during periods between said sealant transfers, and excess sealant removal means for removing excess sealant by permitting the same to at least initially flow away from said transfer face means to thereby leave a substantially uniform amount of sealant in the form of a meniscus of the transfer face means, said transfer head and said container member holding means cooperating to cause a container member to periodically contact said sealant meniscus in order to transfer a substantially uniform amount of sealant from said transfer head to said container member to cover said container member area with sealant.

2. Apparatus of claim 1, wherein the area of the container member that is to be covered includes the edges of push-in easy opening closures in a can end.

3. Apparatus of claim 2, wherein said container member holding means and a container member held therein are moved downward into contact with said meniscus on said face means.

4. Apparatus of claim 3, wherein said transfer face means comprises two annular shoulders at the free end of an upstanding isolated portion of said transfer head said shoulders defining an annular gap thereinbetween.

5. Apparatus of claim 2, wherein said transfer head includes side means which extend downwardly away from said transfer face means for removing excess sealant from the immediate vicinity of said transfer face means.

6. Apparatus for periodically applying substantially uniform amounts of sealant material to the edges of push-in easy opening closures in can ends, said apparatus comprising a sealant transfer head for continuously forming a meniscus of sealant during periods between sealant transfers, a substantially uniform amount of the sealant being transferable to said can end, said sealant meniscus having a configuration generally corresponding to said edges, sealant supply means for continuously supplying sealant through said sealant transfer head to said sealant meniscus, said sealant supply means cooperating with said sealant transfer head so that said sealant supply means provides to said sealant transfer head sealant in an amount, during the period of time from the application of sealant to a given can end to the application of sealant to the next can end, which is in excess of the amount of sealant required to cover said edges of a given can end, and said sealant on said sealant transfer head continuously forms said meniscus of sealant during periods between sealant transfers, side means extending downwardly away from the sealant area for removing excess sealant by permitting the same to flow away from said sealant transfer head to thereby leave a substantially uniform amount of sealant in the form of a meniscus on the sealant transfer head, excess sealant collection means for collecting said excess sealant, and sealant contact means for periodically bringing the sealant on said sealant transfer head into contact with a fresh can end to transfer said substantially uniform amount of sealant to said edges of said fresh can end.

7. Apparatus for applying sealant material to a container member, said apparatus comprising a sealant transfer head including sealant transfer face means for forming an annular meniscus of sealant a part of which can be transferred to said container member, said face means and said meniscus having a configuration generally corresponding to the area of the container member that is to be covered by sealant, said sealant transfer head having sealant supply passage means opening to said face means for supplying sealant thereto, said transfer head including annular upstanding portions isolated from the surrounding parts of said head and on the free end of which said transfer face means is located, said upstanding annular portions defining external side wall means, extending downwardly away from said transfer face means, for removing excess sealant by permitting same to flow away from said transfer face means, wherein the inner of said side wall means defines conduit means leading to an inner excess sealant collection means inside said annular sealant transfer face means, and the outer of said side wall means leads to an outer excess sealant collection means outside said sealant transfer face means, said sealant supply passage means being different from said excess sealant collection means, sealant supply means connected to said sealant supply passage means for supplying amounts of sealant through said sealant supply passage means to said transfer face means in an amount which is in excess of the amount of sealant required to cover said container member area, and sealant contact means for bringing the sealant on said transfer face means into contact with said container member area to transfer sealant to said container member area.

8. Apparatus of claim 7, wherein said annular sealant transfer face means is circular.

9. Apparatus of claim 8, wherein said sealant supply passage means is circular.

10. Apparatus of claim 9, wherein said container member is a can end.

11. Apparatus of claim 10, wherein said sealant contact means brings said container member into close proximity but not into contact with said transfer face means to transfer a major proportion of the sealant on said transfer face means to said container member while leaving said transfer face means wet with sealant.

12. Apparatus of claim 11, wherein said sealant supply means includes a positive displacement pump.

* * * * *